United States Patent [19]

Gellert

[11] Patent Number: 4,611,394
[45] Date of Patent: Sep. 16, 1986

[54] METHOD OF MANUFACTURE OF AN INJECTION MOLDING INTEGRAL HEATED PROBE

[76] Inventor: Jobst U. Gellert, 7A Prince Street, Georgetown, Ontario, Canada, L7G 2X1

[21] Appl. No.: 680,286

[22] Filed: Dec. 10, 1984

Related U.S. Application Data

[63] Continuation-in-part of Ser. No. 453,572, Dec. 27, 1982, abandoned.

[30] Foreign Application Priority Data

Dec. 17, 1982 [CA] Canada .................................. 417995

[51] Int. Cl.$^4$ .............................................. H05B 3/00
[52] U.S. Cl. ..................................... 29/611; 228/221
[58] Field of Search .............. 29/611, 157 C; 219/523; 425/548, 549; 164/61, 80, 108; 228/221, 217, 219

[56] References Cited

U.S. PATENT DOCUMENTS

| | | | |
|---|---|---|---|
| 4,120,086 | 10/1978 | Crandell | 29/611 |
| 4,238,671 | 12/1980 | Gellert | 219/421 |
| 4,355,460 | 10/1982 | Gellert | 29/611 |
| 4,376,244 | 3/1983 | Gellert | 219/523 |
| 4,403,405 | 9/1983 | Gellert | 29/611 |
| 4,424,622 | 1/1984 | Krause | 29/611 |

FOREIGN PATENT DOCUMENTS

1174020  9/1984  Canada .

Primary Examiner—Mark Rosenbaum
Assistant Examiner—P. W. Echols
Attorney, Agent, or Firm—Riches, McKenzie & Herbert

[57] ABSTRACT

This invention relates to a method of manufacturing integral melt conveying nozzle probes for injection molding. The generic term nozzle probe is used herein to include both nozzles through which the melt flows centrally and probes which it flows along the outside of. The method includes forming a stainless steel outer member to receive an electrical heater member therein with a longitudinal space therein. A long thin thermocouple sleeve having a closed forward end is located in the space, which is then sealed against leakage by applying a nickel brazing paste to the joints and brazing them in a vacuum furnace. Copper is then cast into the space in a vacuum furnace to provide a metallurgical bond between the highly conductive copper and the heating element, the thermocouple sleeve and the other parts of the nozzle probe. After casting, a long thin drill is inserted into the sleeve to drill through the closed forward end and a predetermined distance into the copper. The use of the sleeve avoids the problem of the drill wondering slightly off line and ruining the whole unit. A thermocouple can be removably inserted into the bore with its head precisely located in the highly conductive material adjacent the forward end of the nozzle probe to provide an accurate and reliable measurement of temperature in this critical area.

19 Claims, 17 Drawing Figures

METHOD OF MANUFACTURE OF AN INJECTION MOLDING INTEGRAL HEATED PROBE

This application is a continuation-in-part of application Ser. No. 453,572 filed Dec. 27, 1982, now abandoned.

BACKGROUND OF THE INVENTION

This invention relates to a method of manufacturing integral heated melt conveying nozzle probes for injection molding each of which have a removable thermocouple that extends down into highly conductive material adjacent the forward end to continuously measure the temperature in that area during use.

It is well known to provide injection molding systems with elongated probes, each of which projects into a melt passage along which the melt flows around the probe on the way to the gate. An example of this is shown in the applicant's U.S. Pat. No. 4,376,244 which issued Mar. 8, 1983. It is also well known to provide injection molding systems with elongated hollow nozzles or sprue bushings, each of which has a central passage through which the melt flows on the way to the gate. Examples of this are shown in the applicant's U.S. Pat. Nos. 4,238,671 which issued Dec. 9, 1980; 4,355,460 which issued Oct. 26, 1982; and 4,403,405 which issued Sept. 13, 1983. Both of these elongated probes and nozzles have internal electric heaters and in the present application the generic term nozzle probe is used to refer to them both.

As is also well known, close temperature control of the melt, particularly in the gate area, has become increasingly critical as more difficult engineering materials are being molded in more difficult applications. Cast and economical considerations have made systems having a large number of cavities which run more reliably desirable. Therefore, in order to improve the control of temperature in the gate area, it is advantageous to provide nozzle probes with the facility of improved temperature measurement at the forward end.

In view of the fact that thermocouples do burn out or malfunction relatively frequently, it is desirable that nozzle probes have a thermocouple receiving well or sleeve into which and from which the thermocouple is insertable and removable. This also avoids limiting the method of manufacture of the nozzle probe to steps which will not damage the thermocouple, which would otherwise be the case.

U.S. Pat. No. 4,120,186 to Crandell which issued Oct. 17, 1978 discloses a nozzle with a swaged construction having a thermocouple well which extends to the forward end and from which the thermocouple can be removed. However, the structure disclosed in each of the embodiments in Crandell shows the thermocouple or thermocouple well extending adjacent a compressible material. This has the disadvantage that it does not provide a measurement of the temperature at the forward end of the nozzle which is sufficiently accurate and reliable for materials which are difficult to mold because temperature requirements are critical.

Figure 8:
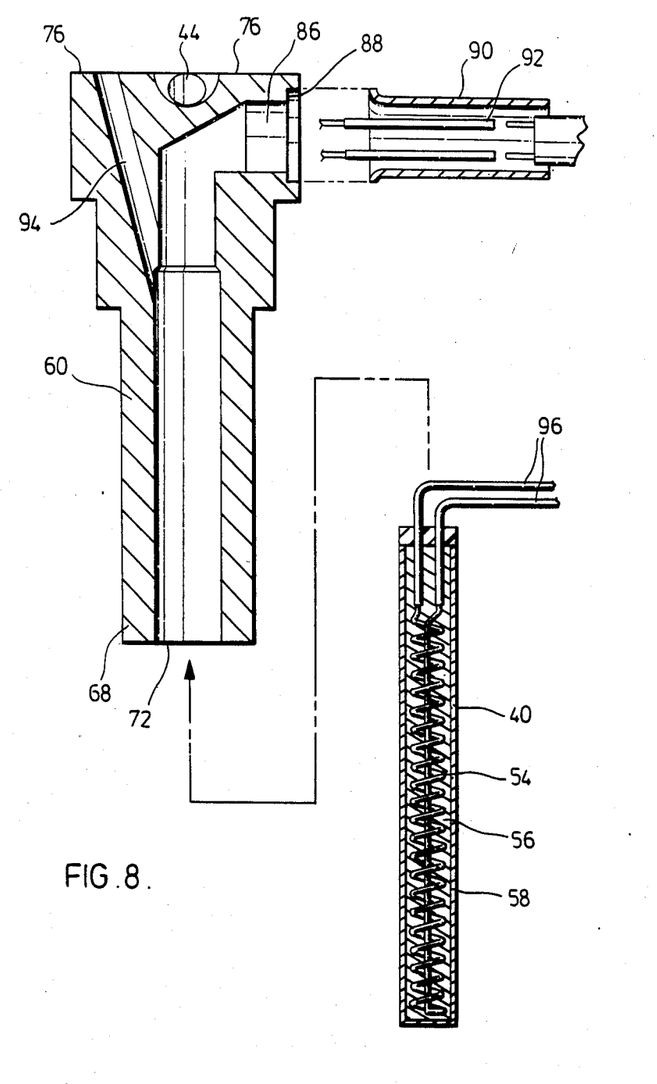
FIG. 8 is a sectional view of the main body portion taken along line 8—8 in FIG. 4 showing the filler duct and electrical terminal opening.

Of course, the normal method of providing a well for a removable thermocouple is to drill it in the desired location. An example of this is shown in U.S. Pat. No. 4,424,622 to Krause which issued Jan. 10, 1984 and describes a method of drilling a thermocouple well through a plug into an injection molding manifold. While this method works very satisfactory for that application, it cannot be used for the present situation where close tolerances for the location of the well are essential. The problem is that the bore of the thermocouple receiving well must be very small in diameter because of the limited amount of space beside the heater member and the small size of the thermocouple itself. As a result, gun drills which are currently available are not capable of reliably drilling such small diameter wells or bores to the length required without the danger of wondering off line and thereby ruining the unit. Until the present invention, this difficulty has prevented the manufacture of nozzle probes with removable thermocouples extending into highly conductive material adjacent the forward end of a nozzle probe. As shown in FIG. 8 of the applicant's above mentioned U.S. Pat. No. 4,355,460, previously the thermocouple had to be cast in with the result that the whole unit has to be scrapped when the thermocouple fails.

SUMMARY OF THE INVENTION

Accordingly, it is an object of the present invention to at least partially overcome these disadvantages by providing an improved method of manufacturing a nozzle probe having an integral structure with a sleeve or well for removably receiving a thermocouple which will accurately and reliably measure temperature in the highly conductive material at the forward end of the nozzle probe.

To this end, in one of its aspects, the invention provides a method of manufacturing an injection molding melt conveying probe having an elongated outer member, an electrical heater member which is centrally received in the outer member and is at least partially surrounded by a highly conductive material to transfer heat to the outer member along which melt flows during use, and a sleeve adapted to removably receive a thermocouple extending longitudinally in the outer member, comprising the steps of forming the outer member of a suitable corrosion resistant material with a rear end and a forward end, the outer member being hollow to form a longitudinally extending space therein; drilling a thermocouple sleeve receiving bore in the outer member, the bore extending longitudinally from the rear end of the outer member into said space near the forward end of the outer member; inserting the elongated thermocouple receiving sleeve into said bore, the sleeve having an inner thermocouple receiving bore, an open rear end adjacent the rear end of the outer member and a closed forward end in alignment with said space adjacent the forward end of the outer member; inserting the electrical heater member into said space to extend centrally in the outer member, the heater member having electrical leads which extend out through a terminal opening in the outer member; sealing the joints around said space to prevent leakage during casting; vacuum casting highly conductive material into said space in the outer member to surround at least a portion of the heater member and the forward end of the thermocouple receiving sleeve and form an integral structure; and drilling through the closed forward end of the thermocouple receiving sleeve to provide an extension of the thermocouple receiving bore a predetermined distance into the highly conductive material, whereby the removable thermocouple can be inserted to extend to an accurate position in the highly conductive material near the forward end of the outer member.

In another of its aspects, the invention provides a method of manufacturing an injection molding melt conveying nozzle having a hollow elongated outer member with a rear end and a forward end, a hollow cylindrical inner member which defines a central melt passage extending longitudinally therethrough, an electrical heater member with a helical portion which extends between the inner and outer members and is surrounded by a highly conductive material to transfer heat from the heater member to the inner member, and a sleeve adapted to removably receive a thermocouple extending in the highly conductive material longitudinally between the heater member and the outer member, comprising the steps of forming the inner and outer members of a suitable corrosion resistant material whereby a longitudinally extending space is formed between them when they are assembled; locating the elongated thermocouple receiving sleeve having a thermocouple receiving bore to extend longitudinally through said space from an open rear end adjacent the rear end of the outer member to a closed forward end near the forward end of the outer member; inserting the electrical heater member into said space, the heater member having a longitudinally extending helical portion which is spaced between the inner member and the thermocouple receiving sleeve and a terminal portion which extends out through an opening in the outer member adjacent the rear end; sealing the joints around said space to prevent leakage during casting; vacuum casting highly conductive material into said space between the inner and outer members to bond to the helical portion of the heater member and the thermocouple sleeve and form an integral structure; and drilling through the closed forward end of the thermocouple receiving sleeve to provide an extension of the thermocouple receiving bore a predetermined distance into the highly conductive material, whereby the removable thermocouple can be inserted to extend to an accurate position in the highly conductive material near the forward end of the outer member.

Further objects and advantages of the invention will appear from the following description taken together with the accompanying drawings.

BRIEF DESCRIPTION OF THE DRAWINGS

FIG. 9 is a sectional view of the partially completed probe with the cartridge heater inserted and the nose portion and filler tube brazed on;

DESCRIPTION OF THE PREFERRED EMBODIMENTS

Figure 1:
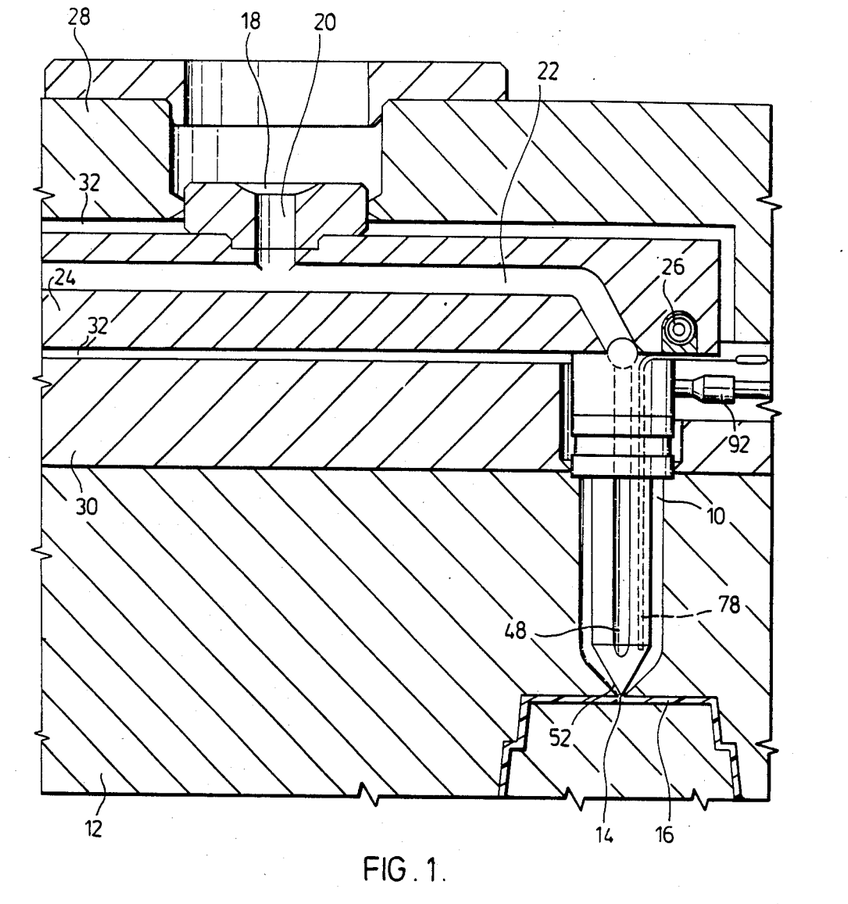
FIG. 1 is a sectional view of a portion of an injection molding system showing the use of a heated probe manufactured according to one embodiment of the invention.

Reference is first made to FIG. 1 which shows a portion of a multi-cavity injection molding system having a number of heated probes 10 according to one embodiment of the invention. Each elongated probe 10 is seated in a cavity plate 12 in alignment with a gate 14 leading to a cavity 16. Pressurized melt is received from a molding machine (not shown) at a recessed inlet 18 to a melt conduit 20 which branches out to the respective probes 10. The melt from each branch 22 flows longitudinally past the heated probe 10 and through the gate 14 into the cavity 16. The manifold 24 is also heated by an insulated heating element 26 such as that shown in the applicant's Canadian patent No. 1,174,020 entitled "Injection Molding Manifold Member and Method of Manufacture" which issued Sept. 11, 1984. The heated manifold 24 and the probe 10 are generally spaced from the cool back plate 28 and retainer plate 30 by an air space 32 to provide thermal insulation between them.

Figure 2:
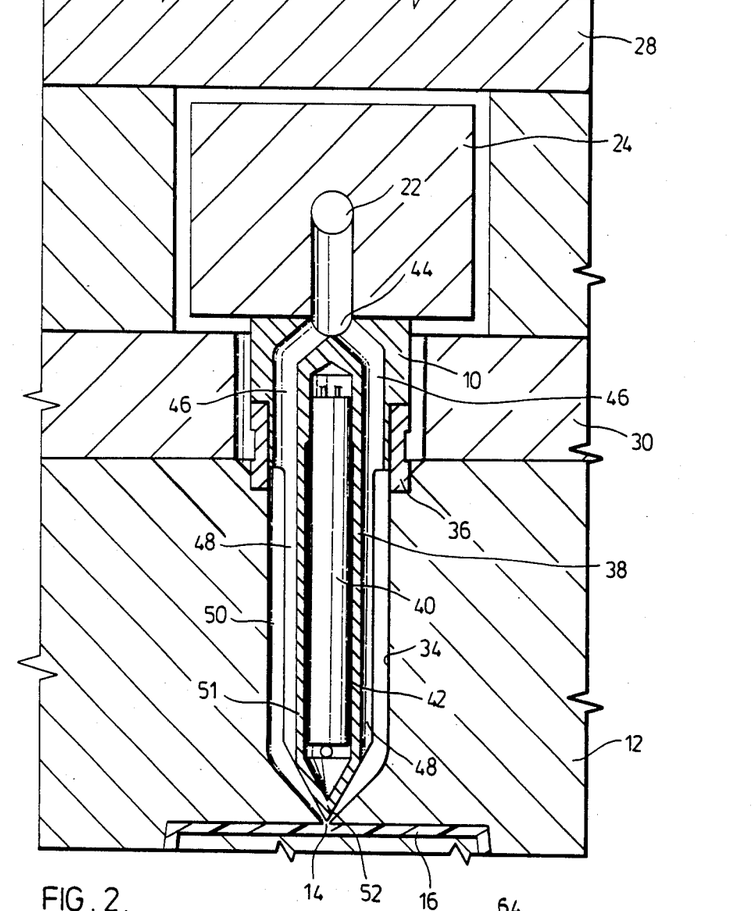
FIG. 2 is a sectional view of the system shown in FIG. 1.

Referring now to FIG. 2, it may be seen that the probe 10 is seated in a well 34 in the cavity plate 12 where it is centrally located by an insulation bushing 36 which minimizes heat loss to the cooled cavity plate. The heated probe 10 has an outer member 38 and an inner heater member 40 which are integrally joined by a highly conductive material 42 which is cast into the space between them. As may be seen, the melt conduit 20 through the manifold 24 extends to a common inlet 44 to two melt passages 46 extending longitudinally through the outer member 38. A portion of the way along the outer member, these melt passages continue as externally open melt channels 48. Thus, the melt initially fills the space 50 between the heated probe and the cooled cavity plate 12, and some of it solidifies and provides thermal insulation between the probe and the cavity plate. However, sufficient heat is provided in the area of the channels 48 to keep them open, providing for preferred flow of the melt with less pressure drop from the passages 46, through the channels 48, past the pointed forward tip end 52 of the outer member and through the gate 14 into the cavity 16. The provision of these externally open channels 48 reduces the side-to-side dimension of the lower portion 51 of the outer member, permitting the probes to be installed closer together which is of importance for some applications. Flow of the melt through the channels is controlled in a conventional manner by the application of pressure, but it will be appreciated that the application of heat, particularly to the forward tip end 52 in the gate area, is of critical importance to the reliable operation of the system.

In this embodiment of the invention, the inner heater member 40 is a cartridge heater made in a conventional manner with an electrical heating coil 54 extending through a heat transfer material 56 inside a generally cylindrical outer casing 58. The heat transfer material is normally magnesium oxide powder and the outer casing is usually swaged to compress the magnesium oxide powder around the heating coil 54 to improve heat transfer. The probe outer member 38 is formed of stainless steel which has sufficient strength and is corrosion resistant to withstand the effect of the heated and pressurized melt over a long period of time. The material 42 cast into the space between the heater member 40 and the outer member 38 is copper which is highly conductive to carry heat from the heater member 40 to the outer member 38, particularly towards its tip end 52.

Figure 3:
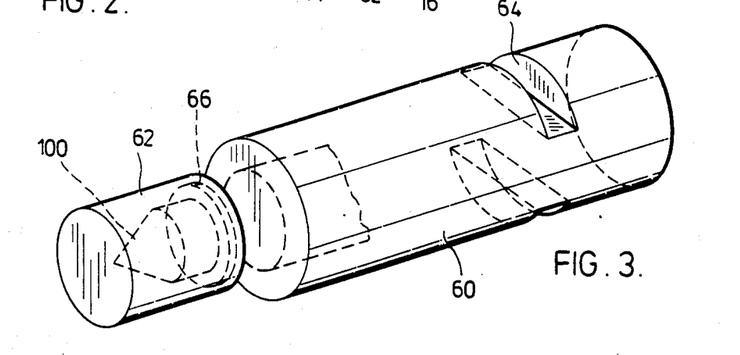
FIG. 3 is an isometric view of the main body and nose portions of the outer member.
Figure 4:
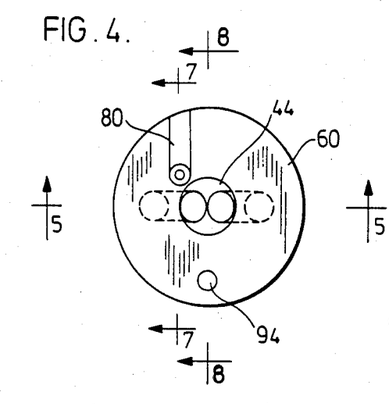
FIG. 4 is a plan view of the main body portion of the outer member.
Figure 5:
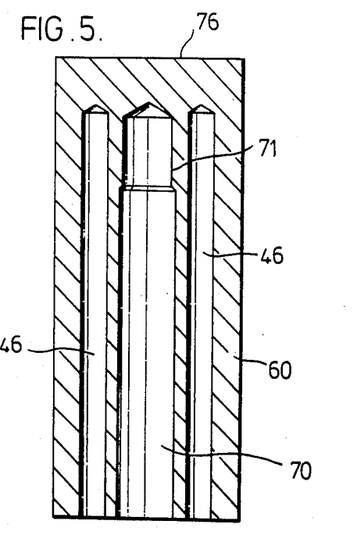
FIGS. 5 and 6 are sectional views of the main body portion taken along line 5—5 in FIG. 4 showing two steps in forming the melt passages.
Figure 6:
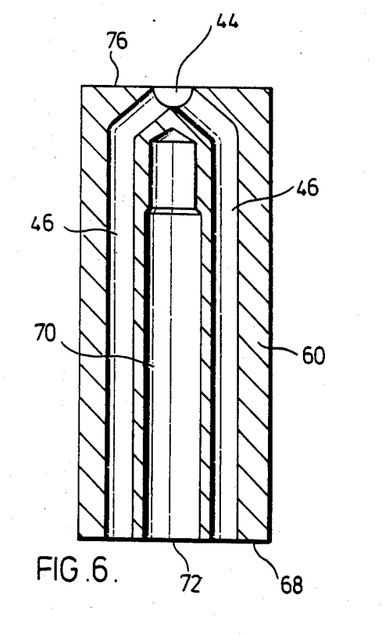

A method of manufacturing the probe 10, according to one embodiment of the invention, will now be described with reference to the remainder of the Figures. FIG. 3 illustrates a main body portion 60 and a nose portion 62 from which the outer member 38 of the probe 10 is formed. As may be seen, the main body portion 60 is machined to have locating slots 64 and the nose portion 62 is formed with a seat 66 to receive the lower end 68 of the main body portion 60, as described below. As shown in FIGS. 5 and 6, the main body portion of the outer member 38 is then drilled to form an elongated cylindrical well 70 extending centrally from an open mouth 72 at the lower end 68 with the pair of melt passages 46 extending longitudinally on either side. The well 70 is formed with a reduced portion 71 towards its upper end, the purpose of which will be described later. Referring to FIG. 6, the two passages 46 connect at the common inlet 44 centrally located at the upper end 76 of the main body portion above the well 70.

Figure 7:
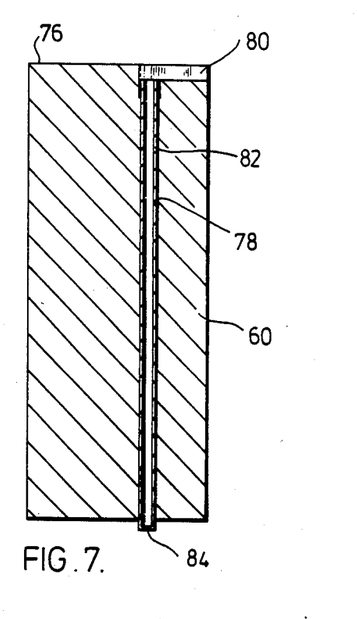
FIG. 7 is a sectional view of the main body portion taken along line 7—7 in FIG. 4 showing the thermocouple bore and sleeve.

FIG. 7 shows a separate thermocouple bore 78 which is drilled longitudinally through the main body portion from one end to the other. A cross groove 80 is also provided at the upper end 76 for the thermocouple lead. In view of the difficulty in drilling the bore 78 with a sufficiently small diameter, a metal sleeve 82 having a closed bottom end 84 is inserted into the bore 78 until the bottom end 84 projects somewhat below the lower end 68 of the main body portion. This sleeve 82 may be conveniently formed of stainless steel thin-walled seamless tubing which is modified before or after insertion to seal the bottom end 84. As may be seen, it is desirable to seal the bore 78 around the sleeve 82 to prevent leakage during casting, and this is described below.

As illustrated in FIG. 8, an electrical terminal opening 86 is bored radially into the main body portion 60 to connect with the heater well 70 adjacent the upper end 76. The opening 86 has a seat 88 to receive one end of an outer protective sleeve 90 of the cold electrical terminal 92. A filler duct 94 is drilled to extend diagonally from the upper end 76 of the main body portion 60 to connect with the heater well 70 just below where it connects with the terminal opening 86. The main body portions 60 are then machined to provide the shape shown in FIG. 8. A lower portion of each main body portion is reduced in diameter to form a shoulder 116 which receives the insulation bushing 36. Reducing the lower portion also exposes a portion of the melt passages 46 and forms the externally open melt channels 48.

Figure 9:
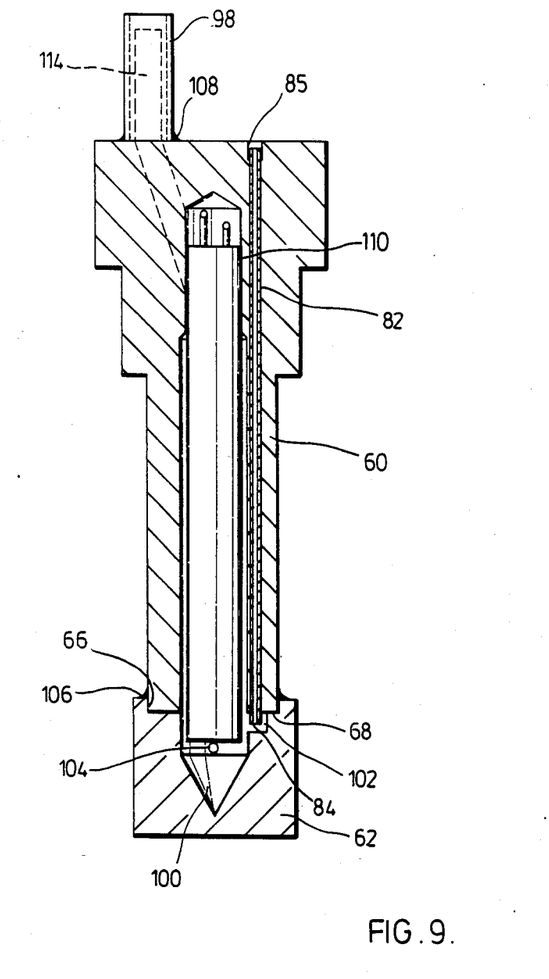

The cartridge heater 40 is then inserted into the heater well 70 through its mouth 72 with the electrical leads 96 extending out through the terminal opening 86 to connect to the cold terminal 92. The reduced portion 71 of the well centers the heater 40 and also provides a sufficiently small clearance which may be sealed by brazing, as described below. The lower end 68 of the main body portion 60 is then seated in the seat 66 in the nose portion 62 and an open ended hollow filler tube 98 is positioned on the upper end 76 of the main body portion. As may be seen in FIG. 9, in this embodiment, the nose portion 62 is formed with a central cavity 100 which is generally conical shaped, but has an offset portion 102. In the assembled position, the cavity 100 in the nose portion 62 is generally in alignment with the heater well 70 to receive a portion of the cartridge heater 40, and the offset portion 102 extends into alignment with the thermocouple bore 78. As shown in FIG. 9, the cavity 100 is bridged by a spacer pin 104 which extends across the conical shaped portion.

Following assembly, a nickel brazing paste is applied to the joint 106 between the main body portion 60 and the nose portion 62 and around the base 108 of the filler tube 98. Brazing paste is also located around the cartridge heater 40 to form a seal 110 between it and the reduced portion 71 of the well to prevent leakage into the terminal opening 86. This may be done with a syringe which is inserted through the terminal opening 86. Brazing paste is also applied around the top end 85 of the thermocouple sleeve 82 to seal against leakage between it and the bore 78. The end of the cold terminal protective sleeve 90 is then inserted into seat 88 and brazing paste applied around it. The assembly is then heated in batches in a vacuum furnace 112 which melts the nickel brazing compound at a temperature of about 2180° F. which causes it to run around the joints and brazes them to fix the nose portion 62, filler tube 98 and cold terminal 92 in position and seals the space between the outer member 38 and the cartridge heater 40 against leakage.

Figure 10:
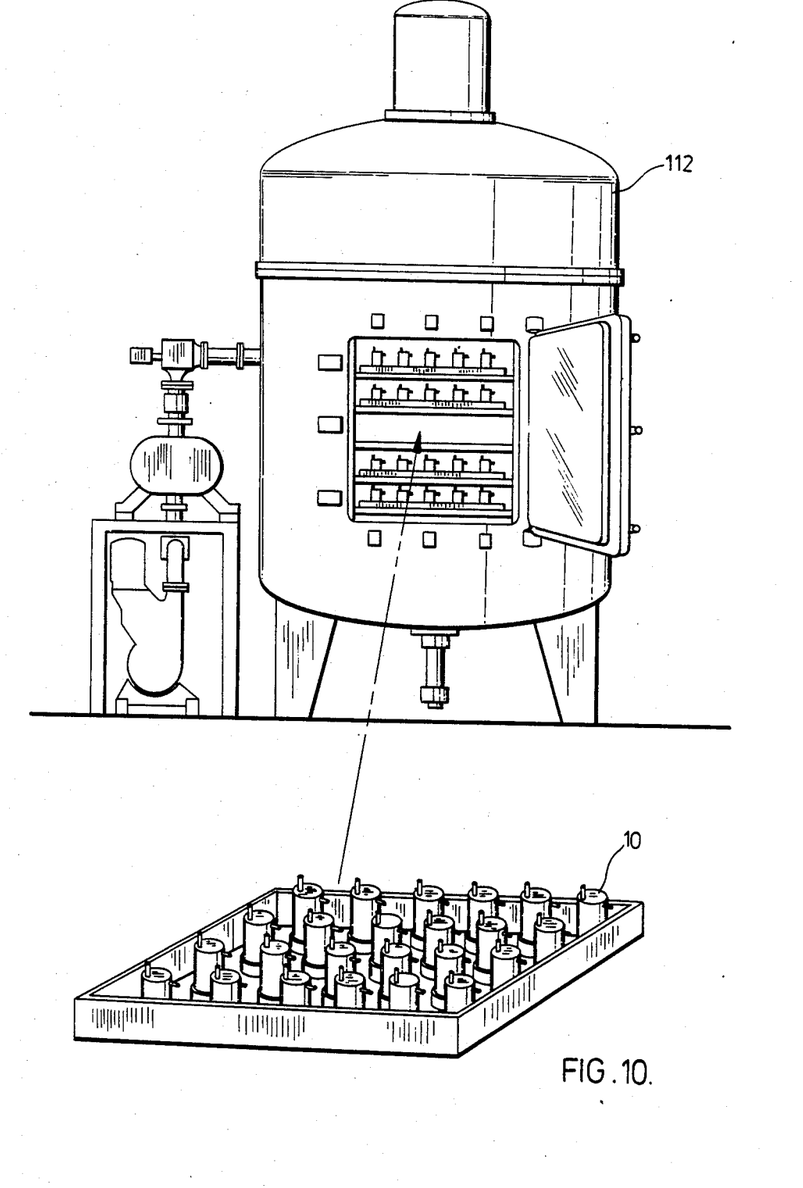
FIG. 10 shows a tray of partially completed probes ready for insertion into the vacuum furnace for casting.

After removal from the vacuum furnace, a slug 114 of a predetermined quantity of copper is inserted into each filler tube 98. They are then reinserted into the vacuum furnace in an upright position and heated until the copper melts. The melted copper flows down through the filler duct 94 and fills the space between the cartridge heater 40 and the outer member 38 up to the seal 110. By evacuating the air before the copper melts, the vacuum furnace causes the copper to flow entirely around the cartridge and fuse to both the outer member 38 and the outer casing 58 of the cartridge heater, thus considerably improving heat transfer from the heater. As mentioned above, spacer pin 104 bridges the cavity 100 in the nose portion thus ensuring that the copper flows down to fill it as well. As is apparent, this casting of the copper in the vacuum furnace requires that the batches of probes 10 be heated for a sufficient period of time and to a temperature to fill the space, without melting the nickel brazing. In the case of copper this is to a temperature of about 1960°-1980° F. In addition to bonding the cartridge heater 40 to the outer member 38, this avoids the formation of any insulative air gaps around the heater which can otherwise cause it to burn out by the formation of "hot spots" along its length.

Figure 11:
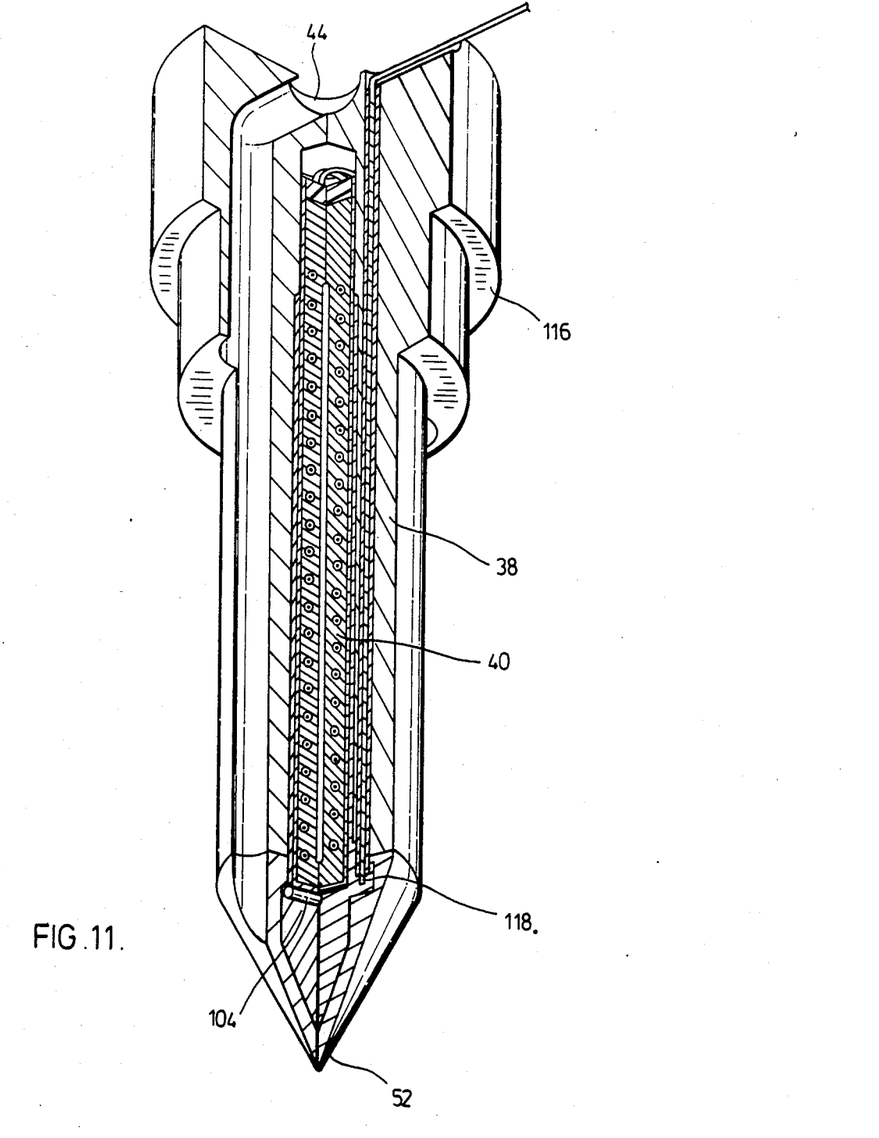
FIG. 11 is a partial sectional view of a completed heated probe which has been manufactured according to this embodiment of the invention.

When the probes 10 have been removed from the furnace and annealed, they are each machined again to produce the finished product shown in FIG. 11. The nose portion 62 is ground shaped to provide the desired shape of pointed tip end 52 and the filler tube 98 is removed from the upper end 76. While in this embodiment, the machining to expose the melt channels 48 is described as occurring before casting, it could also be done after, although the cost of grinding the hardend material would be considerable.

As described above, when the copper is cast into the space between the heater 40 and the outer member 38, it fills the cavity 100 in the nose portion 62, including the offset portion 102 of the cavity in alignment with the thermocouple bore 78. Afterwards, a thin drill is inserted through the hollow sleeve 82 in the thermocouple bore 78 to open the closed bottom end and extend into the copper in the offset portion 102 of the cavity 100. A thermocouple 118 is then inserted through bore 78 into contact with the highly conductive copper. Thus, the temperature of the copper adjacent the pointed tip end 52 of the probe 10 may be accurately measured and the thermocouple 118 may be removed and replaced if it malfunctions. In addition to not being separately replaceable, the previous thermocouples which are not removable cannot be used in an integral casting process such as presently described because the casting temperatures damage the thermocouples.

Figure 12:
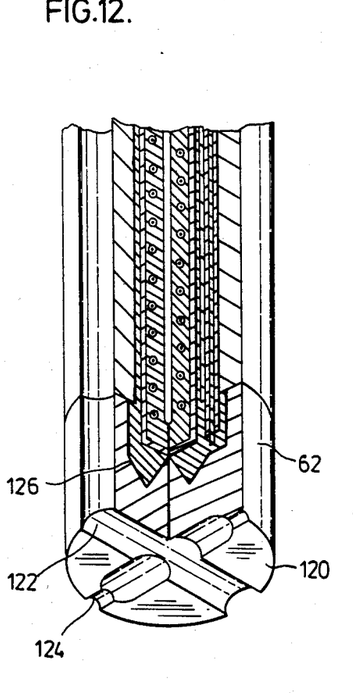
FIG. 12 is a sectional view of a nose portion of the outer member having a somewhat different configuration.
Figure 13:
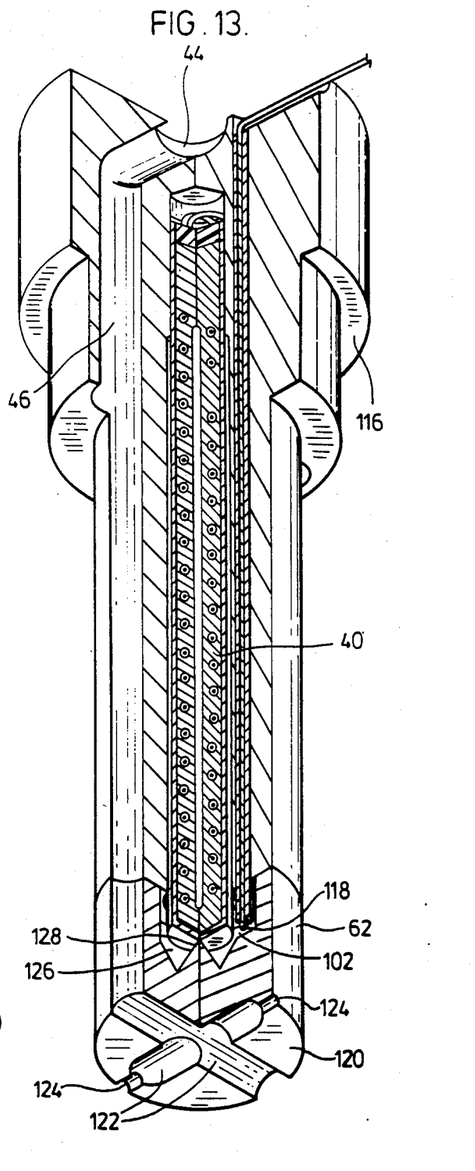
FIG. 13 is a partial sectional view of a completed heated probe with the nose portion shown in FIG. 12.

FIGS. 12 and 13 show a heated probe 10 which is manufactured according to the invention, but which may be used for edge gating. As most of the features are identical to those described above, common features which are described and illustrated will be referred to by the same reference numerals. As may be seen, the cartridge heater 40 and the main body portion 60 of the outer member 38 are the same as described above. However, the nose portion 62 is different. Rather than being pointed, the forward end 52 is formed with a generally flat surface 120 with grooves 122 extending across it. The grooves 122 extend from the open melt channels 48 to edge gates 124 which lead to the cavities (not shown). The cavity 100 is formed in the nose portion 62 with a number of hollows 126 surrounding a central peak 128. When the nose portion 62 is assembled on the main body portion 60 with the cartridge heater 40 inside, a spacer pin is not required as the cartridge heater rests on the central peak 128. Otherwise, the method of manufacturing the probe 10 shown in FIGS. 12 and 13 is the same as that described above and need not be repeated.

Figure 14:
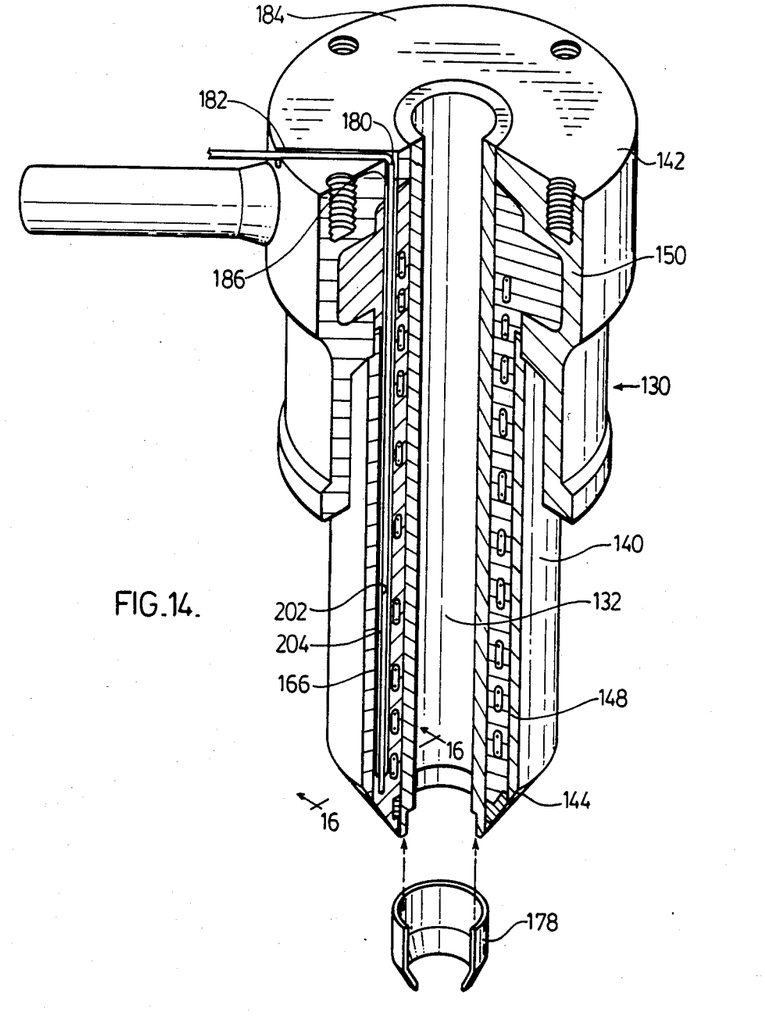
FIG. 14 is a cut-away isometric view of a nozzle or sprue bushing which has been manufactured according to another embodiment of the invention.
Figure 15:
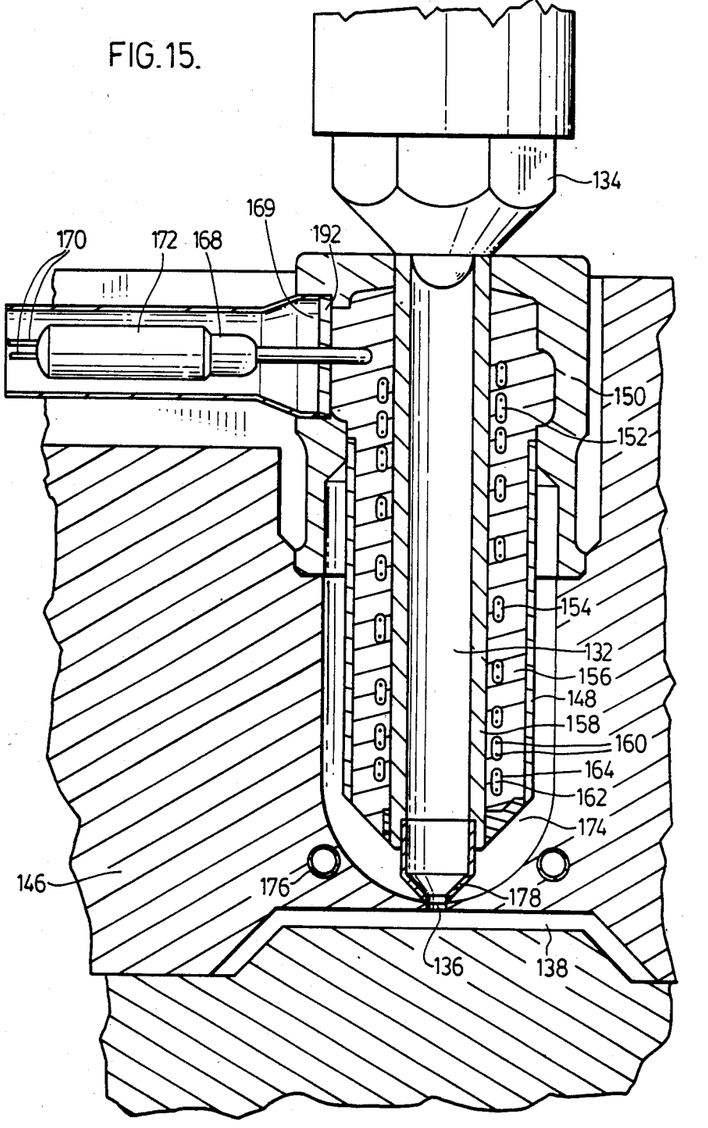
FIG. 15 is a sectional view of a portion of an injection molding system showing the use of the nozzle seen in FIG. 14, through which the melt flows centrally.

Reference is now made to FIGS. 14 and 15 which show an injection molding system having a nozzle or sprue bushing 130 to convey the melt, rather than a probe as described in the foregoing embodiments. As is well known in the art, in a nozzle 130 the melt conduit or passage 132 from the molding machine 134 to the gate 136 leading to the cavity 138 passes centrally through the nozzle 130, rather than along the outside which is the case with a probe. The nozzle 130 has an elongated outer member 140 with a rear end 142 and a forward end 144, and is seated in a cavity plate 146 in alignment with the gate 136. The outer member 140 is formed of an outer sleeve portion 148 and a back collar portion 150.

The nozzle 130 is heated by an electric heating element or member 152 having a helical portion 154 which is cast into a highly conductive material 156 between the outer member 140 and a generally cylindrical inner member 158 which forms the melt passage 132. The inner and outer members 158,140 are formed of a suitable corrosion resistant material such as stainless steel, and the highly conductive material 156 which is cast in as described in more detail below, is copper.

Figure 16:
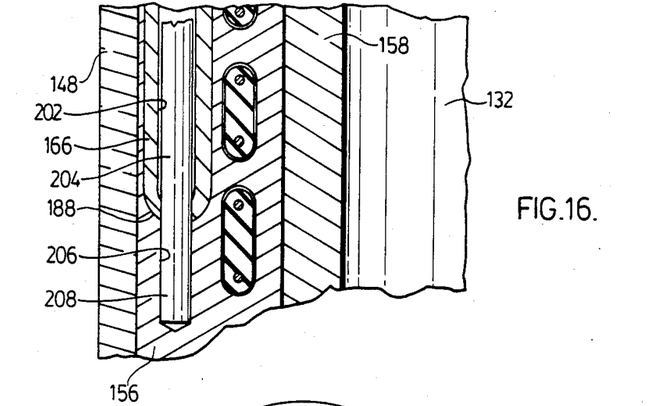
FIG. 16 is a scrap sectional view showing the relationship of the heating element and the thermocouple sleeve.

As clearly shown in FIG. 16, in this embodiment, the heating element 152 is of the double wire type with the chromalloy resistance wire 160 extending through a refractory powder electrical insulating material 162 such as compacted magnesium oxide inside a steel casing 164. As may be seen, the helical portion 154 of the heating element 152 has been swaged to provide a flattened configuration not only to improve heat distribution but also to provide more space for the thermocouple sleeve 166. The heating element 152 has an enlarged cold terminal 168 which extends out through an opening 169 in the outer member 140 near its rear end 142. The ends of the resistance wire 160 are joined (not shown) to larger diameter terminal wires 170 which extend from the cold terminal. A hollow connector sleeve 172 is mounted on the back collar portion 150 of the outer member 140 to protect the cold terminal 168.

An insulative air space 174 is provided between the hot nozzle 130 and the surrounding cavity plate 146 which is cooled by water flowing through cooling elements 176. This air space 174 is bridged by a generally cylindrical titanium seal 178 which is seated in the nozzle 130 to extend around the gate 136.

The steps involved in the manufacture of the nozzle according to one embodiment of the invention will now be described, with particular reference to FIG. 17. As shown, the stainless steel inner and outer members 158,140 are made somewhat longer than the finished product. A hole 180 is drilled through the rear end 142 of the outer member leading to a groove 182 in the rear surface 184. A thermocouple sleeve 166 made from stainless steel thin-walled seamless tubing with an open rear end 186 and a closed forward end 188 is mounted in the outer member by inserting its rear end 186 into the hole 180. The inner and outer members are assembled as shown with the heating element 152 mounted with its helical portion 154 extending in a space 190 extending longitudinally between them. The cold terminal 168 of the heating element extends through the opening 169 in the outer member 140 and the connector sleeve 172 is mounted to extend around the cold terminal 168. A seal 192 formed of split washers as described in the applicant's U.S. Pat. No. 4,403,405 which issued Sept. 13, 1983 is provided to close the opening 169 around the cold terminal 168. Nickel brazing paste or other suitable material is applied to the seal 192 around the inner end of the connector sleeve 172, around the rear end of the thermocouple sleeve, and to the joints between the inner and outer members and the assembly is then heated in a vacuum furnace (not shown). This causes the brazing paste to run around the joints and then brazes them to provide an integral structure with the space 190 sealed against leaking during casting.

Figure 17:
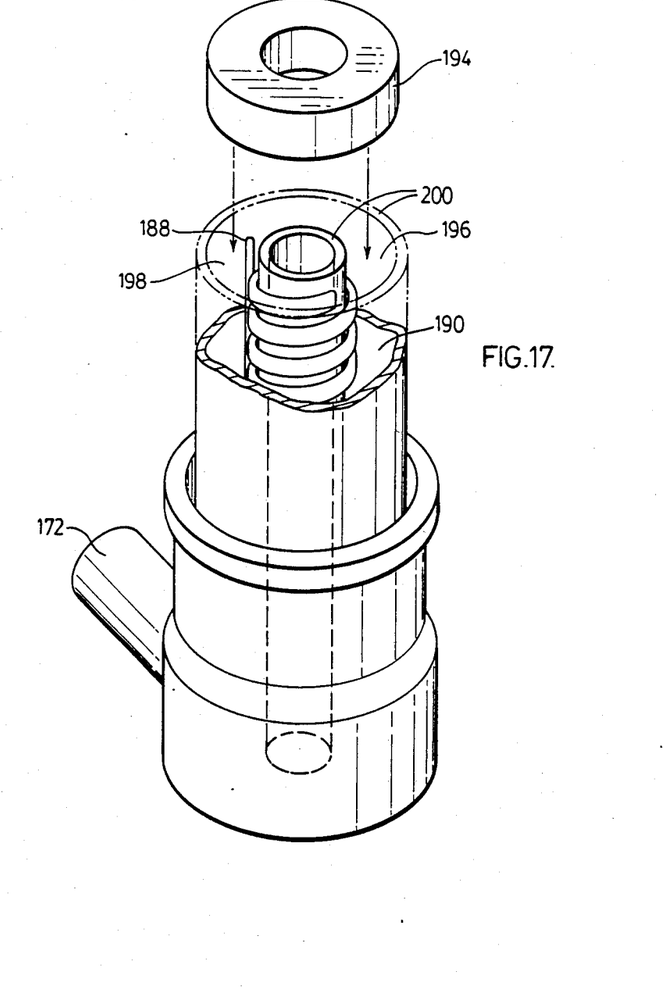
FIG. 17 is an isometric view of a partially completed nozzle from which the manufacturing steps can be understood.

After brazing, with the assembly remaining in the upright position shown in FIG. 17, a donut shaped slug 194 of a predetermined amount of copper is inserted into the mouth 196 between the inner and outer members and the assembly is again heated in a vacuum furnace to a predetermined temperature which is sufficient to melt the copper, but not the previously brazed joints. This causes the copper to flow down through the openings or ducts 198 around the inner member 158 and into the space 190 around the heating element 152 and the thermocouple sleeve 166. Casting the copper under a partial vacuum provides a metallurgical bonding of the copper to the heating element and the thermocouple well, as well as to the inner and outer members. Thus an integral structure is provided which efficiently transfers heat from the heating element and distributes it more evenly along the melt passage 132. Although one configuration for casting the copper is shown, it is apparent other arrangements such as shown in above mentioned U.S. Pat. No. 4,403,405 can also be used.

After casting in the copper, the nozzle 130 is machined to remove the protruding portions 200 of the inner and outer members and to provide a desired finish. While a nozzle 130 is shown having one forward end configuration, other configurations may be provided for other types of molding, such as edge gating.

The inside bore 202 of the thermocouple receiving sleeve 166 is usually several thousands of an inch larger in diameter than the thermocouple 204 received in it. This clearance allows for easy insertion and removal of the thermocouple even though it might have small bends or other imperfections. After casting, a thin drill is inserted into the sleeve 166 to drill through the closed forward end 188 to extend the bore 202 a predetermined distance into the copper 156 adjacent the forward end. However, the extension 206 of the bore 202 is made slightly smaller in diameter than the bore of the sleeve 166 so that it is only a few thousands of an inch larger than the head 208 of the thermocouple. Thus, when the thermocouple is inserted into position in the bore 202, its measuring head is snugly received in the bore extension 206 in the highly conductive copper quite close to the gate area. Thus a very accurate and reliable measurement of temperature in this area is provided. Drilling through the sleeve 166 prevents the long thin drill from wondering off line, so that the head of the removable thermocouple is precisely located and the danger of ruining the unit during drilling is virtually eliminated. Of course, if the thermocouple burns out, it can quickly and easily be replaced by another one.

While the description of this invention has been given with regard to particular methods of manufacture, it is not to be construed in a limiting sense. Many variations and modifications will now occur to those skilled in the art. For instance, it is apparent that other suitable materials and heaters may be used, and that the sequence of some of the steps may be changed. Reference is made to the attached claims for a definition of the invention.

What I claim is:

1. A method of manufacturing an injection molding melt conveying nozzle probe having an elongated outer member, an electrical heater member which extends longitudinally in the outer member and is at least partially surrounded by a highly conductive material to transfer heat uniformly to the melt, and a sleeve adapted to removably receive a thermocouple extending longitudinally adjacent the heater member, comprising the steps of:
   (a) forming the outer member of a suitable corrosion resistant material with a rear end and a forward end, the outer member enclosing a longitudinally extending space therein;
   (b) locating a sleeve having a thermocouple receiving bore in the outer member, the sleeve extending longitudinally from an open rear end adjacent the rear end of the outer member to a closed forward end adjacent said space near the forward end of the outer member;
   (c) inserting the electrical heater member into said space to extend longitudinally adjacent the thermocouple receiving sleeve;
   (d) sealing the joints around said space in the outer member;
   (e) vacuum casting highly conductive material into said space in the outer member to surround at least a portion of the heater member and the forward end of the thermocouple receiving sleeve and form an integral structure; and
   (f) drilling through the closed forward end of the thermocouple receiving sleeve to extend the thermocouple receiving bore further into the highly conductive material, whereby the thermocouple can be accurately located in the highly conductive material near the forward end of the outer member.

2. A method of manufacturing an injection molding melt conveying probe having an elongated outer member, an electrical heater member which is centrally received in the outer member and is at least partially surrounded by a highly conductive material to transfer heat to the outer member along which melt flows during use, and a sleeve adapted to removably receive a thermocouple extending longitudinally in the outer member, comprising the steps of:
   (a) forming the outer member of a suitable corrosion resistant material with a rear end and a forward end, the outer member being hollow to form a longitudinally extending space therein;
   (b) drilling a thermocouple sleeve receiving bore in the outer member, the bore extending longitudinally from the rear end of the outer member into said space near the forward end of the outer member;
   (c) inserting the elongated thermocouple receiving sleeve into said bore, the sleeve having an inner thermocouple receiving bore, an open rear end adjacent the rear end of the outer member and a closed forward end in alignment with said space adjacent the forward end of the outer member;
   (d) inserting the electrical heater member into said space to extend centrally in the outer member, the heater member having electrical leads which extend out through a terminal opening in the outer member;
   (e) sealing the joints around said space to prevent leakage during casting;
   (f) vacuum casting highly conductive material into said space in the outer member to surround at least a portion of the heater member and the forward end of the thermocouple receiving sleeve and form an integral structure; and
   (g) drilling through the closed forward end of the thermocouple receiving sleeve to provide an extension of the thermocouple receiving bore a predetermined distance into the highly conductive material, whereby the removable thermocouple can be inserted to extend to an accurate position in the highly conductive material near the forward end of the outer member.

3. A method as claimed in claim 2 wherein the extension of the thermocouple receiving bore is slightly smaller in diameter than the thermocouple receiving bore through the sleeve.

4. A method as claimed in claim 3 wherein the outer member has an elongated main body portion through which the thermocouple sleeve receiving bore is drilled and a nose portion which is received on the main body portion after the heater member is inserted.

5. A method as claimed in claim 4 comprising the further steps of:

forming at least one melt passage extending generally longitudinally through the outer member, and machining the outer member to expose said at least one melt passage along a portion of its length to form at least one externally open channel.

6. A method as claimed in claim 4 including the further step of machining the outer member to form the forward end of a predetermined shape and to provide a desired finish.

7. A method as claimed in claim 6 including fixing a filler tube to the outer member to connect to a filler duct leading downwardly through the outer member to the space in the outer member, inserting a predetermined quantity of highly conductive material into the filler tube, and heating in a vacuum furnace to melt the conductive material which flows down through the duct into the space around the heater member, and further including machining off the filler tube after casting.

8. A method as claimed in claim 7 wherein step (e) includes applying brazing material around the thermocouple receiving sleeve, around the joint between the nose portion and the main body portion of the outer member, and around the heater member between the filler duct and the terminal opening, and brazing in a vacuum furnace to fix the nose portion to the main body portion and to seal the space against leakage during casting.

9. A method as claimed in claim 6 wherein at least two external melt channels are provided along a portion of the length of the outer member and extend from respective melt passages which branch out from a common inlet at the rear end of the outer member.

10. A method as claimed in claim 7 wherein the heating member is a cartridge heater.

11. A method as claimed in claim 10 wherein the corrosion resistant material is stainless steel and the highly conductive material is copper.

12. A method of manufacturing an injection molding melt conveying nozzle having a hollow elongated outer member with a rear end and a forward end, a hollow cylindrical inner member which defines a central melt passage extending longitudinally therethrough, an electrical heater member with a helical portion which extends between the inner and outer members and is surrounded by a highly conductive material to transfer heat from the heater member to the inner member, and a sleeve adapted to removably receive a thermocouple extending in the highly conductive material longitudinally between the heater member and the outer member, comprising the steps of:

(a) forming the inner and outer members of a suitable corrosion resistant material whereby a longitudinally extending space is formed between them when they are assembled;

(b) locating the elongated thermocouple receiving sleeve having a thermocouple receiving bore to extend longitudinally through said space from an open rear end adjacent the rear end of the outer member to a closed forward end near the forward end of the outer member;

(c) inserting the electrical heater member into said space, the heater member having a longitudinally extending helical portion which is spaced between the inner member and the thermocouple receiving sleeve and a terminal portion which extends out through an opening in the outer member adjacent the rear end;

(d) sealing the joints around said space to prevent leakage during casting;

(e) vacuum casting highly conductive material into said space between the inner and outer members to bond to the helical portion of the heater member and the thermocouple sleeve and form an integral structure; and (f) drilling through the closed forward end of the thermocouple receiving sleeve to provide an extension of the thermocouple receiving bore a predetermined distance into the highly conductive material, whereby the removable thermocouple can be inserted to extend to an accurate position in the highly conductive material near the forward end of the outer member.

13. A method as claimed in claim 12 wherein the extension of the thermocouple receiving bore is slightly smaller in diameter than the thermocouple receiving bore through the sleeve.

14. A method as claimed in claim 13 including the further step of machining the outer member to form the forward end of a predetermined shape and to provide a desired finish.

15. A method as claimed in claim 14 further comprising mounting a seal and a connector sleeve over the terminal portion of the heater element.

16. A method as claimed in claim 15 wherein step (b) comprises drilling a hole through the rear end of the outer member and inserting the rear end of the thermocouple sleeve into the hole, whereby the remainder of the thermocouple sleeve extends through the space between the inner and outer members.

17. A method as claimed in claim 16 wherein the outer member includes a back collar portion and an outer sleeve portion which are joined together during step (d).

18. A method as claimed in claim 17 wherein step (d) includes applying brazing material around the rear end of the thermocouple receiving sleeve which extends through the hole in the rear end of the outer member, around the seal and connector sleeve and around the joints between the inner and outer members, and brazing in a vacuum furnace to form a rigid assembly and to seal the space against leakage during casting.

19. A method as claimed in claim 18 wherein the corrosion resistant material is stainless steel and the highly conductive material is copper.

* * * * *